US012719655B2

(12) United States Patent
Pasdast et al.

(10) Patent No.: US 12,719,655 B2
(45) Date of Patent: Aug. 25, 2026

(54) CLOCK PHASE MANAGEMENT FOR DIE-TO-DIE (D2D) INTERCONNECT

(71) Applicant: Intel Corporation, Santa Clara, CA (US)

(72) Inventors: Gerald Pasdast, San Jose, CA (US); Peipei Wang, San Jose, CA (US); Lakshmipriya Seshan, Sunnyvale, CA (US); Juan Zeng, San Jose, CA (US); Zuoguo Wu, San Jose, CA (US); Zhiguo Qian, Chandler, AZ (US); Narasimha Lanka, Dublin, CA (US); Debendra Das Sharma, Saratoga, CA (US); Swadesh Choudhary, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/743,085

(22) Filed: May 12, 2022

(65) Prior Publication Data

US 2022/0271912 A1 Aug. 25, 2022

Related U.S. Application Data

(60) Provisional application No. 63/295,139, filed on Dec. 30, 2021.

(51) Int. Cl.
*H04L 7/00* (2006.01)

(52) U.S. Cl.
CPC .................................. *H04L 7/0033* (2013.01)

(58) Field of Classification Search
CPC ..... H04L 7/0033; H04L 25/45; H04L 7/0008; H01L 25/0655; G06F 1/10
USPC ................................ 375/257, 371, 373, 258
See application file for complete search history.

(56) References Cited

U.S. PATENT DOCUMENTS 9,645,603 B1 * 5/2017 Chall ........................ G06F 1/10
2008/0175327 A1 * 7/2008 Truong .................. H04L 25/45 375/257
2017/0012629 A1 1/2017 Yoshimi
2018/0276164 A1 * 9/2018 Das Sharma ....... H01L 25/0655
2020/0051610 A1 2/2020 Zerbe et al.
(Continued)

FOREIGN PATENT DOCUMENTS

JP 2018164242 A 10/2018

OTHER PUBLICATIONS

International Search Report and Written Opinion mailed Apr. 12, 2023 for International Application No. PCT/US2022/051233, 13 pages.

(Continued)

*Primary Examiner* — Chieh M Fan
(74) *Attorney, Agent, or Firm* — Alliance IP, LLC

(57) ABSTRACT

Embodiments herein may relate to a die for use in a multi-die package. The die may include clock circuitry that is able to identify a phase of a data signal to be transmitted and a phase of a clock signal to be transmitted on a die-to-die (D2D) link. The clock circuitry may further be configured adjust the phase of the clock signal such that the phase of the clock signal is approximately 90 degrees from the phase of the data signal such that the clock signal and the data signal are received by a receiver die of the D2D link with a 90 degree phase difference. Other embodiments may be described and claimed.

19 Claims, 11 Drawing Sheets

(56) References Cited

U.S. PATENT DOCUMENTS

| | | | |
|---|---|---|---|
| 2020/0212917 | A1 | 7/2020 | Zerbe et al. |
| 2020/0334196 | A1 | 10/2020 | Nassif et al. |
| 2021/0082481 | A1 | 3/2021 | Navaratnam et al. |
| 2021/0097015 | A1 | 4/2021 | Das Sharma et al. |
| 2022/0271912 | A1 | 8/2022 | Pasdast et al. |

OTHER PUBLICATIONS

International Preliminary Report on Patentability mailed Jul. 11, 2024 for International Application No. PCT/US2022/051233, 9 pages.
EESR Notice of Extended European Search Report issued in EP Patent Application No. 22917168.1 issued on Nov. 11, 2025 (12 pages).

* cited by examiner

CLOCK PHASE MANAGEMENT FOR DIE-TO-DIE (D2D) INTERCONNECT

CROSS-REFERENCE TO RELATED APPLICATIONS

The present application claims priority to U.S. Provisional Patent Application No. 63/295,139, filed on Dec. 30, 2021, the contents of which are hereby incorporated by reference herein in their entirety.

BACKGROUND

Increasing die-to-die (D2D) bandwidth is a trend that may require scalable physical layer (PHY) architecture solutions in addition to packaging technology scaling. Specifically, it may be desirable to have circuit microarchitectures that are multi-process node friendly, relatively simple to fit within small bump pitch, and tolerant to power-supply noise or jitter of the interconnect.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
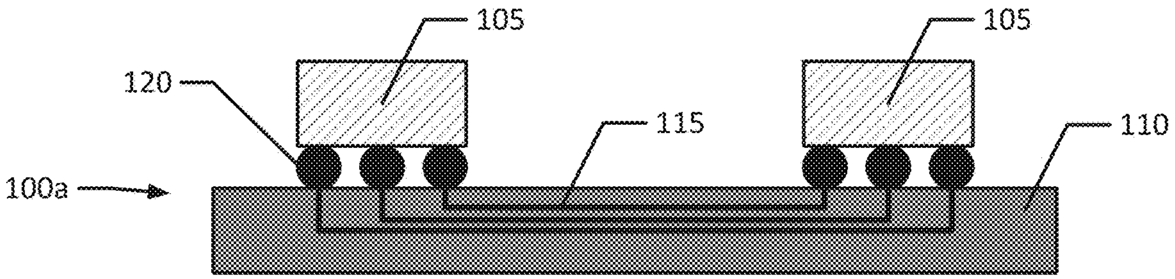
FIGS. 1*a*, 1*b*, and 1*c* illustrate various packages that may include die-to-die (D2D) interconnects, in accordance with various embodiments.

Embodiments described herein may include apparatus, systems, techniques, or processes that are directed to clock phase management for D2D interconnects. Specifically, embodiments relate to managing the phase of the clock and one or more data lanes at the transmitter of a D2D interconnect such that the clock and data signals are received at the receiver of the D2D with a 90 degree phase from one another.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

As previously described, it may be desirable to have circuit microarchitectures for D2D interconnects that are multi-process node friendly, relatively simple to fit within small bump pitch, and tolerant to power-supply noise or jitter of the interconnect. Embodiments herein relate to circuits architectures that include a matched clock/data source-synchronous clocking architecture. Specifically, the architecture may have a 0.5 unit interval (UI) separation between the phase of the clock lane of the interconnect and the phase of one or more data lanes of the cluster of data lanes of the interconnect. The architecture may further include the option of forwarded $V_{CC}$, which may provide for improved link performance operating on noisy power-supply environments. Embodiments may also allow for die-independent dynamic voltage and frequency scaling (DVFS) operation for optimization of power consumption of the multi-die package.

Embodiments may provide a number of advantages. For example, embodiments may provide relatively simple circuit architectures that are all digital or nearly all-digital, which may allow for scaling of the area and/or bump-pitch of the circuit architecture. Embodiments may also allow for matching of data/clock source-synchronous paths with clocking on the transmitter side, which may allow for frequency scaling in noisy power supply environments. Specifically, the matching may allow for increase reliability of data transmissions at higher-frequency clock ranges. Embodiments may also allow for simultaneous die-independent DVFS operation for workload-dependent power optimization. Embodiments may further allow for forwarded clock tracking mechanisms for low-frequency voltage and temperature drift post-training/centering.

Figure 1B:
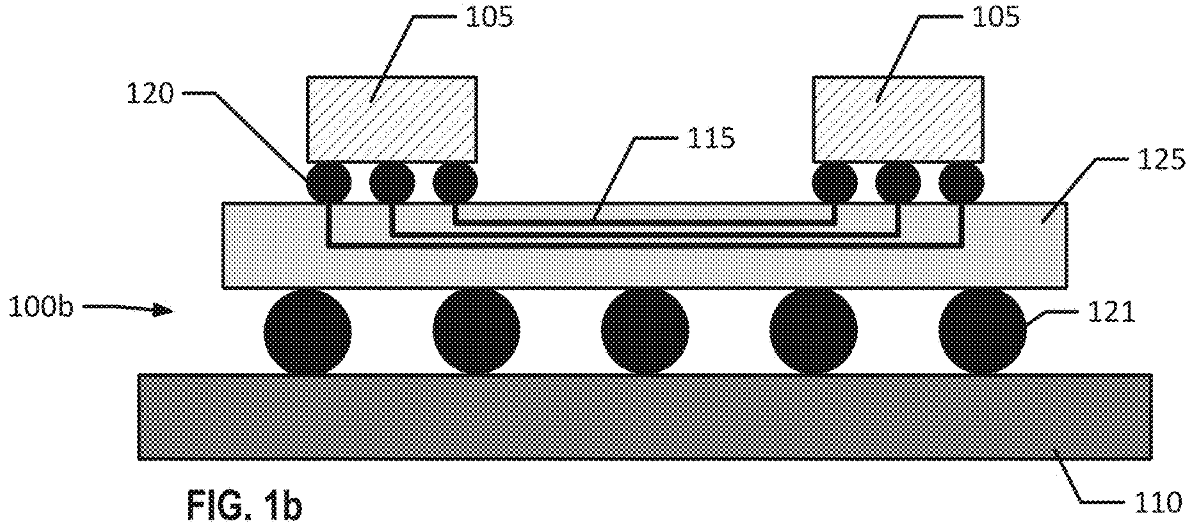
Figure 1C:
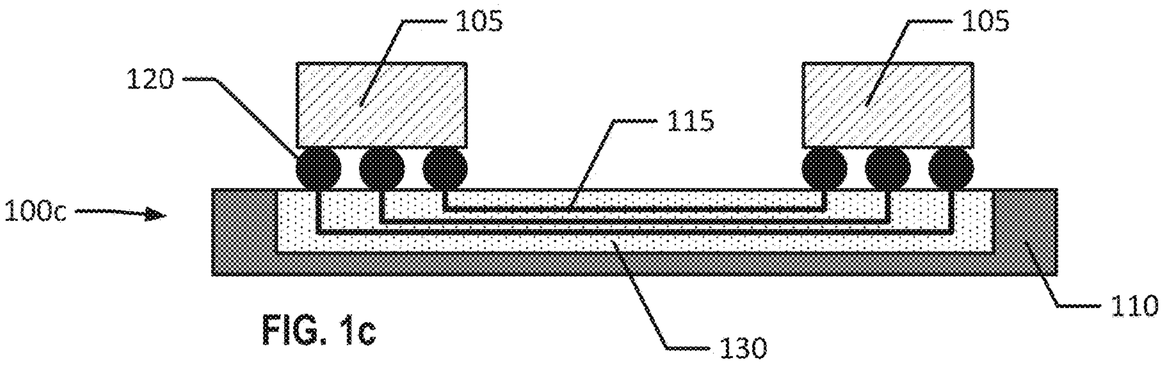

FIGS. 1*a*, 1*b*, and 1*c* (collectively "FIG. 1") illustrate various packages that may include die-to-die (D2D) interconnects, in accordance with various embodiments.

Specifically, FIG. 1*a* depicts an example package 100*a* that may include a plurality of dies 105. The dies may be, be related to, or include, for example, a processor, a multi-core processor, a memory, a retimer, and/or some other element. In some embodiments both dies 105 on a package may be the same type of element (e.g. both dies 105 may be processors), while in other embodiments the dies 105 may be of different types from one another. The dies 105 may be coupled with a package substrate 110 by a plurality of interconnects 120. The package substrate 110 may be, for example, a printed circuit board, a motherboard, or some other type substrate. The interconnects 120 may be, for example bumps of a ball grid array, pins of a pin grid array, or some other type of interconnect. The dies 105 may be communicatively coupled by one or more conductive element 115. The conductive elements 115 may be, include, or be part of, for example, micro-strips, strip lines, traces, vias, or some other type of conductive element.

In embodiments, one or more of the conductive elements 115 may be a part of a D2D interconnect link. The D2D interconnect link may include a clock lane, a valid lane, and a cluster of data lanes. Specifically, in some embodiments, such as the embodiment of FIG. 1*a*, the cluster of data lanes may include 16 data lanes on which data may be transmitted. In some embodiments, such as the embodiments of FIG. 1*b* or 1*c* the cluster of data lanes may include 64 data lanes on which data may be transmitted. In some embodiments, the "cluster" of data lanes may additionally or alternatively be referred to as a "module."

In some embodiments, different ones of the lanes of the D2D interconnect may be on different ones of the conductive elements 115. In other embodiments, one or more of the lanes of the D2D interconnect may be on a same one of the conductive elements 115 (for example, multiplexed onto a same conductive element 115).

FIG. 1*b* illustrates an alternative example package 100*b*. The package 100*b* may include various elements similar to those of package 100*a*, and their description will not be reiterated here for the sake of conciseness and clarity. The package 100 be may include and interposer 125 that is coupled with the package substrate 110 by a plurality of interconnects 121. The dies 105 may be coupled with the interposer 125 by interconnects 120. The interposer 125 may be a substrate such as package substrate 110, while in other embodiments the interposer 125 may be or include a different type of substrate. Generally, the interposer 125 may be a substrate configured to couple with dies 105 it a pitch smaller than that of a pitch of the package substrate 110. In some embodiments, the interposer 125 may be referred to as a chip on wafer on substrate (CoWoS) structure. In some embodiments, the interconnects 120 may be of the same type as interconnects 121 (for example, the may both be elements of a ball grid array or a pin grid array), while in other embodiments the interconnects 120 may be of a different form than interconnects 121.

FIG. 1*c* illustrates an alternative example package 100*c*. The package 100*c* may include various elements similar to those of package 100*a*, and their description will not be reiterated here for the sake of conciseness and clarity. The package may include a bridge 130 positioned in the package substrate 110. In some embodiments, the bridge 130 may be a silicon bridge. In this embodiment, the conductive elements 115 may be at least partially routed through the bridge 130. Generally, the bridge 130 may include a plurality of routing layers, allowing for multiple connections between various dies of a package to be communicatively coupled.

It will be understood that the various embodiments depicted in FIG. 1 are intended as high level example embodiments for the sake of discussion herein. The specific size, or relative sizes, of various elements are intended for illustration and discussion, rather than indicating real-world physical proportions. Additionally, the number of elements, for example the number of dies 105, interconnects 120, or conductive elements 115, may vary in different embodiments as well. Additionally, different embodiments may be combined. For example, in some embodiments a bridge 130 may be present in an interposer 125.

Figure 2:
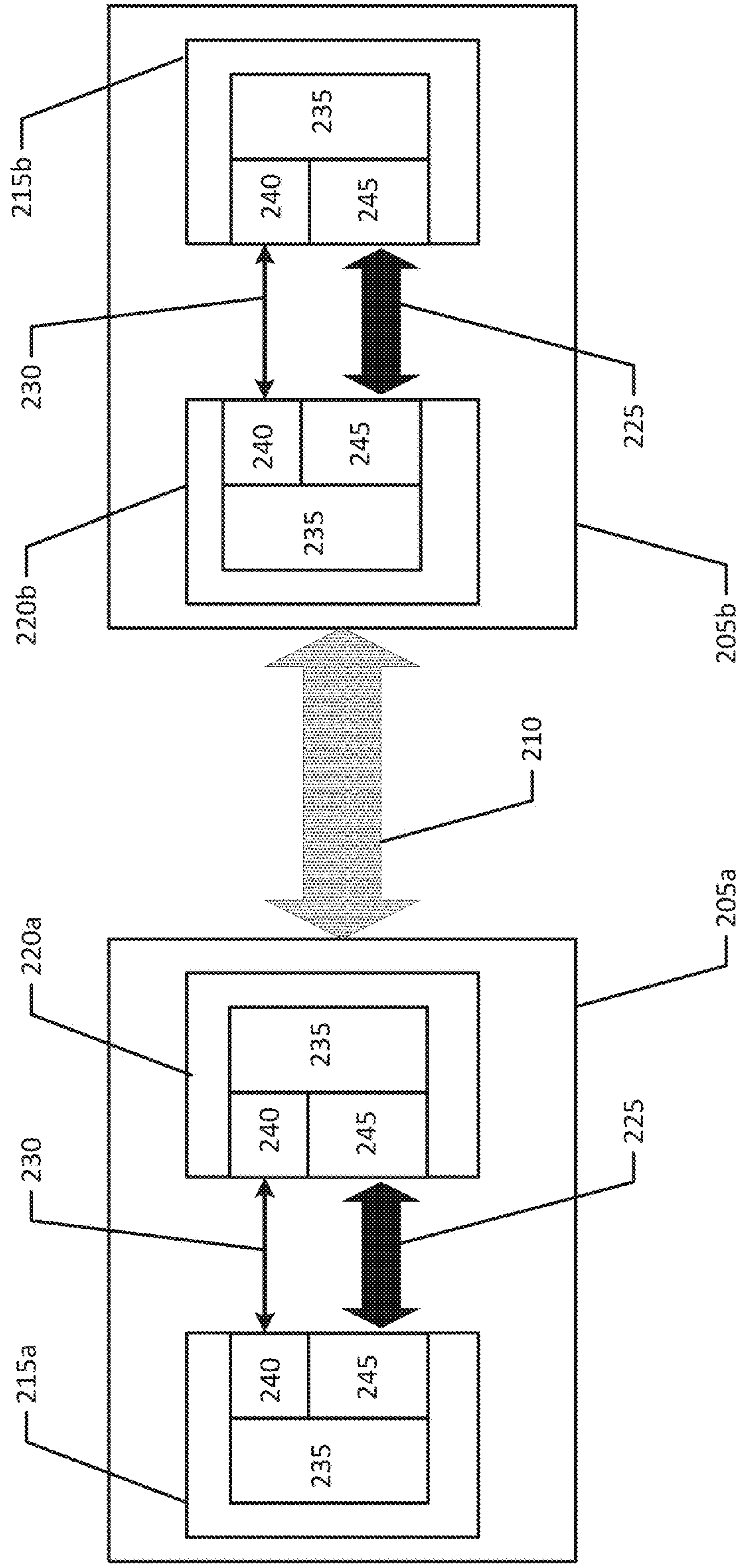
FIG. 2 illustrates example communication pathways between packages that may include D2D interconnects, in accordance with various embodiments.

FIG. 2 illustrates example communication pathways between packages that may include D2D interconnects, in accordance with various embodiments. Specifically, FIG. 2 depicts to packages 205*a* and 205*b*, which may be respectively similar to one of packages 100*a*, 100*b*, 100*c*, or some other package described with reference to FIG. 1. Package 205*a* may include die 215*a* and die 220*a*. Similarly, package 205*b* may include die 215*b* and die 220*b*. Dies 215*a*, 215*b*, 220*a*, and 220*b* may be similar to one of dies 105 described above. In some embodiments, dies 215*a* and 215*b* may be a die such as a processor, a memory, or some other type of die. Dies 220*a* and 220*b* may be a retimer.

For the sake of discussion herein, a retimer may be a die that is configured to receive a signal between a die on a same package and a die on another package, identify data and clock information of that signal, and then retransmit the signal as appropriate. For example, retimer 220*a* may receive a data signal from package 205*b* across interconnect 210. Transmission across interconnect 210 may insert noise and/or errors into the signal. The retimer 220*a* may be configured to identify data and clock information of the signal, remove noise or errors from one or both of the clock information and the data, and then retransmit the signal to die 215*a*. Specifically, the retimer 220*a* may be communicatively coupled with die 215*a* by a mainband 225 and a sideband 230 of a D2D interconnect link. That is, the interconnect link may be referred to as a D2D interconnect link that includes the mainband 225 and the sideband 230.

In some embodiments, the interconnect link formed of the mainband 225 and the sideband 230 may be an interconnect link in accordance with a protocol that is different from that of interconnect link 210. It will be noted that, although discussion herein is provided in the context of retransmission of data from package 205*b* to die 215*a*, in some embodiments the retimer 220*a* may also be configured to retransmit a signal from die 215*a* to package 205*b*. Additionally, in some embodiments the retimer 220*a* may be configured to perform some form of error correction or validation on signals received via interconnect 210 or mainband 225. For example, in some embodiments the retimer 220*a* may be configured to perform one or more of forward error correction (FEC), cyclic redundancy check (CRC), data acknowledgement, or some other error correction.

As used herein, the mainband 225 may be a connection that constitutes a main data path of the D2D interconnect. The mainband may include a forwarded clock lane, a valid lane, and N lanes of data per link. In some embodiments, e.g., packages 100*b* or 100*c*, N may be 64. In some embodiments, e.g., package 100*a*, N may be 16. It will be noted that in some embodiments, additional lanes (e.g., a second valid lane, a second clock lane, etc.) may be present.

The sideband 230 may be a data interface that provides a back-channel for link training. The sideband 230 may additionally allow for access of registers of a link partner (e.g., access by retimer 220*a* to a register of die 215*a*, or vice-versa). The sideband 230 may consist of a forwarded clock lane and a data lane in each direction, and may have a fixed clock speed (e.g., a clock speed on the order of 800 megahertz (MHz)) regardless of a speed of the mainband 225.

The dies 215*a*/215*b* and retimers 220*a*/220*b* may include physical layer (PHY) components such as sideband PHY layer circuitry 240, mainband PHY layer circuitry 245, and PHY layer logic 235 configured to transmit or receive various signals over the mainband 225 and sideband 230 of the D2D interconnect. The mainband PHY layer circuitry 245 and/or sideband PHY layer circuitry 240 may include electrical circuitry such as an analog front end (AFE) and be configured to transmit or receive one or more data signals over the mainband 225 and sideband 230, respectively. Specifically, the mainband PHY layer circuitry 245 may transmit and/or receive data signals over the cluster of data lanes, the valid lane, and the forwarded clock lane as described above. The sideband PHY layer circuitry 240 may transmit and/or receive sideband signals over the sideband 230, as described above. In some embodiments, the circuitry 240/245 may perform additional functions such as clocking, first-in-first-out (FIFO) buffering, serializing/deserializing (SERDES) of signals, etc.

The PHY layer logic 235 may be configured to control operation of the circuitry 240/245, and perform data processing/transfer between the circuitry 240/245 and an interface such as a D2D interface (not shown). Specifically, the logic 235 may perform actions such as link training, lane repair, lane reversal scrambling/de-scrambling, etc. of one or both of the mainband 225 and sideband 230.

It will be noted that, although only single instances of circuitry 240/245 or logic 235 are depicted on respective dies 215*a*/215*b* or retimers 220*a*/220*b*, in other embodiments a die or retimer may have multiple PHY layer logics 235, each with a respective mainband circuitry 245 and sideband circuitry 240. Likewise, a die such as die 215*a* may be coupled with a plurality of other dies via respective mainbands and/or sidebands, or two dies may be coupled with multiple mainbands and/or sidebands. The particular configuration of these couplings may be based on the use case to which the various packages will be put.

Typically, in legacy architectures, the forwarded clock phase may have been adjusted at the receiver of the interconnect link rather than the transmitter side. However, as the frequency of the architecture (i.e., the clock) increases, relying on the receiver to adjust the clock phase may for the phase difference between the clock and one or more of the data signals to have a greater than 0.5 UI separation. For example, in some circuit architectures, the separation may have increased to 1.5 UI, 2.5 UI, 3.5 UI, etc. as the frequency of the clock increased. As the separation increases, even if the clock-to-data placement is trained to the ideal "center" of the data eye, the power supply noise's differential effect on the data lane(s) versus the clock lane may amplify jitter differences between the two paths in the legacy circuit architecture. This amplified jitter may result in link margin degradation that may limit the frequency of the clock signal for the link, or may affect the power necessary for transmission of data on the link. As such, providing higher frequencies on the link may be difficult in legacy receiver-adjusted architectures.

Embodiments herein relate to an architecture that may limit the data-to-clock delay path separation to approximately 0.5 UI. As used herein, "approximately" 0.5 UI may refer to a phase difference between 80 degrees and 100 degrees (although, in other embodiments "approximately" may refer to a greater or lesser phase difference (e.g., 85 and 95 degrees, 70 and 110 degrees, etc.). To phrase another way, "approximately" 0.5 UI may refer to +/−5% of a UI. In other embodiments, "approximately" 0.5 UI may have a larger range such as +/−10% of a UI, +/−15% of a UI, or +/−20% of a UI. Such an architecture may include clock adjustment hardware on the transmit side of the D2D interconnect link, rather than the receive side of the D2D interconnect link as may have been present in legacy packages. The transmit-side clock adjustment hardware may scale and maintain the approximately 0.5 UI data-to-clock delay path separation over a wider (and higher) range of frequencies, thereby removing the frequency limitations that may have been present in legacy architectures. For example, the D2D interconnect may be capable of maintaining the 0.5 UI data-to-clock delay path separation using clock signals with a frequency of greater than or equal to approximately 10 gigahertz (GHz). Such a clock frequency may result in a UI with a length of approximately 100 picoseconds. In other embodiments, the clock signal may have a lower frequency (e.g., as low as approximately 2 GHz), which may result in a UI with a length of approximately 500 picoseconds.

It will be understood that there may be different modes of clocking operations used with respect to embodiments herein. A first mode of clocking operation may be referred to as "double data rate." Double data rate may indicate that both the rising edge of the clock signal and the falling edge of the clock signal may be used to indicate consecutive data UIs. As a result, a 10 GHz forwarded clock lane may support a 20 giga transfers per second (GT/s). In this example, a UI may then be approximately 50 picoseconds long (e.g., 2 data UIs per 100 picosecond clock signal).

The second mode may be referred to as "quad data rate." Quad data rate may be used to limit the top-end clocking frequency that is distributed within a die. In this mode, instead of a 20 GHz signal that is based on forwarding 10 GHz differential clock lanes (e.g., clock and clock #), the system may generate a 20 GHz signal that is based on forwarding 5 GHz clock lanes that have a 90 degree separation. As a result, the system may use 4 total phases of clocks arriving at the receiver die, and each phase may be separated by 90 degrees. All four phases may be used to capture the 20 GT/s data stream on the data lanes coming in.

It will be noted that embodiments herein may relate to, and be described with respect to, double data rate clocks. However, embodiments may be equally applicable to quad data rate clock signals.

Figure 3:
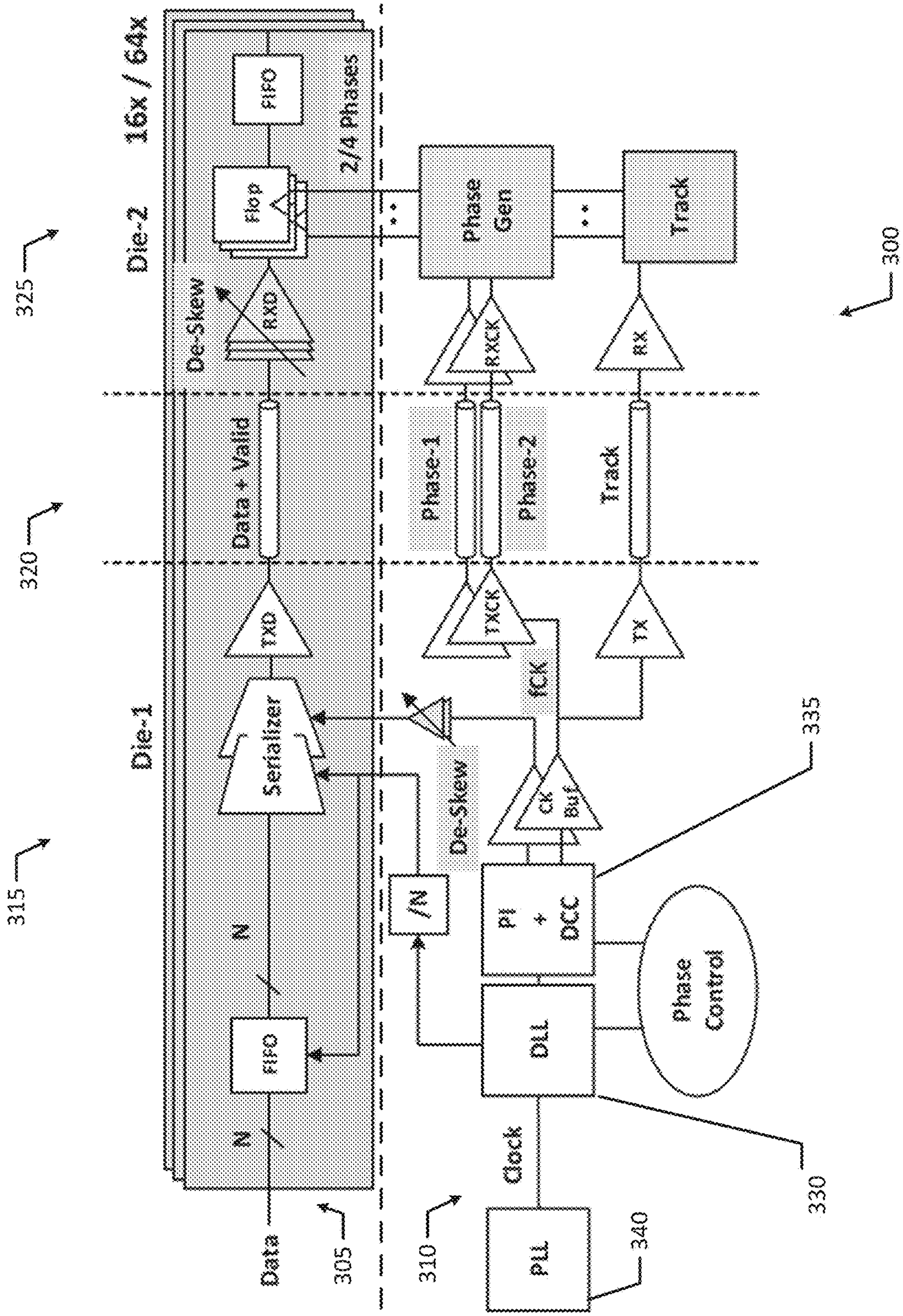
FIG. 3 illustrates a high level example of a clock and data architecture for use with a D2D interconnect, in accordance with various embodiments.

FIG. 3 illustrates a high level example of a clock and data architecture 300 for use with a D2D interconnect, in accordance with various embodiments. Specifically, FIG. 3 depicts an architecture 300 that includes a transmitter die 315, a receiver die 325, and a D2D interconnect link 320. The architecture 300 may include a data architecture 305 and a clock architecture 310.

Generally, the transmitter die 315 and the receiver die 325 may be similar to one or more of dies 105, 215, or 220 as described above. For example, in some embodiments the transmitter die 315 and the receiver die 325 may be a processor, a multi-core processor, a memory, a retimer, or some other type of die. In some embodiments the transmitter die 315 and the receiver die 325 may be the same type of die (e.g., both processors), while in other embodiments the transmitter die 315 may be of a different type than the receiver die 325.

As noted, the data architecture 305 may include a cluster of data lanes. In some embodiments, the data architecture 305 may include 16 data lanes (e.g., in the architecture 100*a*), while in other embodiments the data architecture 305 may include 64 data lanes (e.g., in the architectures 100*b* or 100*c*).

Additionally, as noted, the clock architecture 310 may include circuitry at the transmitter die 315 that is configured to adjust a phase of the clock signal relative to the data signal, as described above. Specifically, the clock architecture 310 may include phase lock loop (PLL) circuitry 340, delay lock loop (DLL) circuitry 330 and phase interpolator (PI)/duty cycle corrector (DCC) circuitry 335. It will be noted that, in some embodiments, the DCC may be referred to or implemented as a duty-cycle adjuster (DCA). More generally, the DCC may include a DCA in combination with a duty cycle sensor (DCS).

In embodiments, the PLL circuitry 340 may provide an initial clock signal, as shown in FIG. 3. The DLL circuitry 330 may receive the initial clock from the PLL circuitry 340, and then generate 2 sets of 8 phases clock (0-degree, 30-degree, 60-degree, 90-degree, 120-degree, 150-degree, 180-degree, 210-degree). One set may be relate to the clock rising edge, and the other set may relate to the clock falling edge.

The DLL circuitry 330 may include one or more phase measurements circuits. As explained below, DLL FSM circuitry 450 may take the results of such phase measurement, then adjust the DLL circuitry 330 delay until there is an approximately 30 degree separation between 2 clock signals.

Then PI+DCC circuitry 335 may receive the 2 sets of 8 phases of clock signals to generate fine-grain adjustment (for example, each 30 degree separation may divide into 32 steps). There are 2 phase interpolators (PIs) and 1 combiner in PI+DCC circuitry. Each PI may receive the 8 phases of the clock signal. The combiner may take the clock rising edge from one PI and takes the clock falling edge from the other PI. In link margin training mode or quadrature clock generation mode, both PIs may adjust the signals in the same direction. In duty cycle correction mode, only one of the PIs may adjust the signal. The difference between the two PI settings is the clock duty cycle correction.

It will be noted that the receiver die 325 may have matched clock and data paths. Specifically, the clock and data paths may include similar elements arranged in a similar layout/order. This matching may help ensure that the delay experienced by the data signal(s) as they traverse the data path(s) may be substantively similar, or identical, to the delay experienced by the clock signal(s) during traversal of the clock path.

Figure 4:
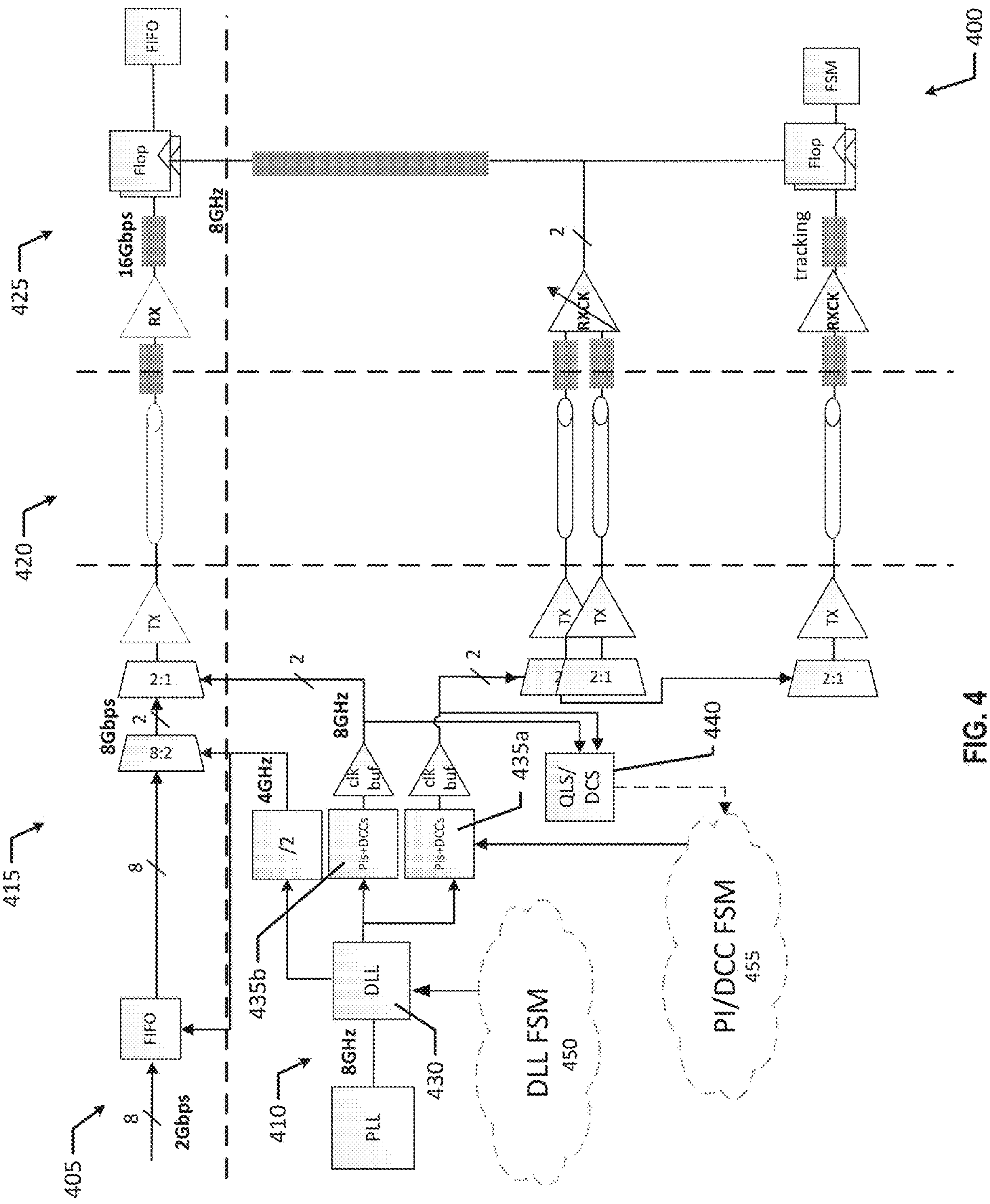
FIG. 4 illustrates a specific example of a clock and data architecture for use with a D2D interconnect, in accordance with various embodiments.

FIG. 4 illustrates a specific example of a clock and data architecture 400 for use with a D2D interconnect, in accordance with various embodiments. Specifically, the architecture of FIG. 4 depicts one specific architecture of elements and circuitry that may implement the architecture 300 of FIG. 3. For example, FIG. 4 depicts a transmitter die 415, a D2D interconnect link 420, and a receiver die 425, which may be respectively similar to elements 315, 320, and 325. The architecture 400 may include a data architecture 405 and a clock architecture 410, which may be respectively similar to data architecture 305 and clock architecture 310.

Notably, the clock architecture 410 may include DLL circuitry 430, which may be similar to DLL circuitry 330. The DLL circuitry may receive input from a DLL finite state machine (FSM) 450. The DLL FSM 450 may be configured to change digital control settings to control or adjust DLL delay provided to PI/DCC circuitry 435*a*/435*b* or other elements of the clock architecture 410. Specifically, the DLL delay may be changed by digital control settings that are provided from the DLL FSM 450.

Similarly, the clock architecture 410 may include PI/DCC circuitry 435*a* and 435*b*, which may function in a manner similar to PI/DCC circuitry 335. Specifically, as shown in FIG. 4, the PI/DCC circuitry may include two separate PI/DCC circuits 435*a* and 435*b*. The PI/DCC circuitry 435*a* and 435*b* may receive input from the DCC circuitry 430. Additionally, the PI/DCC circuitry 435*b* may receive input from a PI/DCC FSM 455. The PI/DCC FSM 455 may be configured to change the phase of PI 435*a* (and 535*a*, as described below), which may be used to sample the data at the receive-side of the circuit. In some embodiments, the PI/DCC FSM 455 may change the reference delay in the QLS block 440. In some embodiments, the PI/DCC FSM 455 may further change the DCA setting of the DCC of the PI/DCC 435*a*.

It will be noted that, in the embodiment of FIG. 4, the DLL FSM 450 is depicted as separate from the DLL circuitry 430, while in other embodiments the DLL FSM 450 may be considered to be an element of the DLL circuitry 430. Similarly to the DLL FSM 450, although the PI/DCC FSM 455 is depicted as separate from the PI/DCC circuitry 435*a* and 435*b*, in some embodiments the PI/DCC FSM 455 may be considered to be an element of one or both of the PI/DCC circuitry 435*a* and 435*b*. Additionally, although the DLL FSM 450 and the PI/DCC FSM 455 are depicted as being separate elements, in some embodiments the DLL FSM 450 and the PI/DCC FSM 455 may be, or be part of, a single FSM.

Additionally, the clock circuitry 410 may include a circuitry 440 which may be one or both of a quadrature lock sentinel (QLS) and duty cycle sentinel (DCS). As may be seen, the circuitry 440 may be coupled with an output of the PI/DCC circuitry 435*a* and 435*b*, and used as an input to the PI/DCC FSM 455. Specifically, the circuitry 440 may generate a delay that is provided to the PI/DCC FSM 455. The delay provided by the circuitry 440 may be used to adjust PI settings provided by the PI/DCC FSM 455. In some embodiments, the delay may further be provided to the DLL FSM 450 (not shown for the sake of clarity of the Figure) and used to adjust the DLL delay used by, or provided by, the DLL FSM 450 to the DLL 430.

Figure 5:
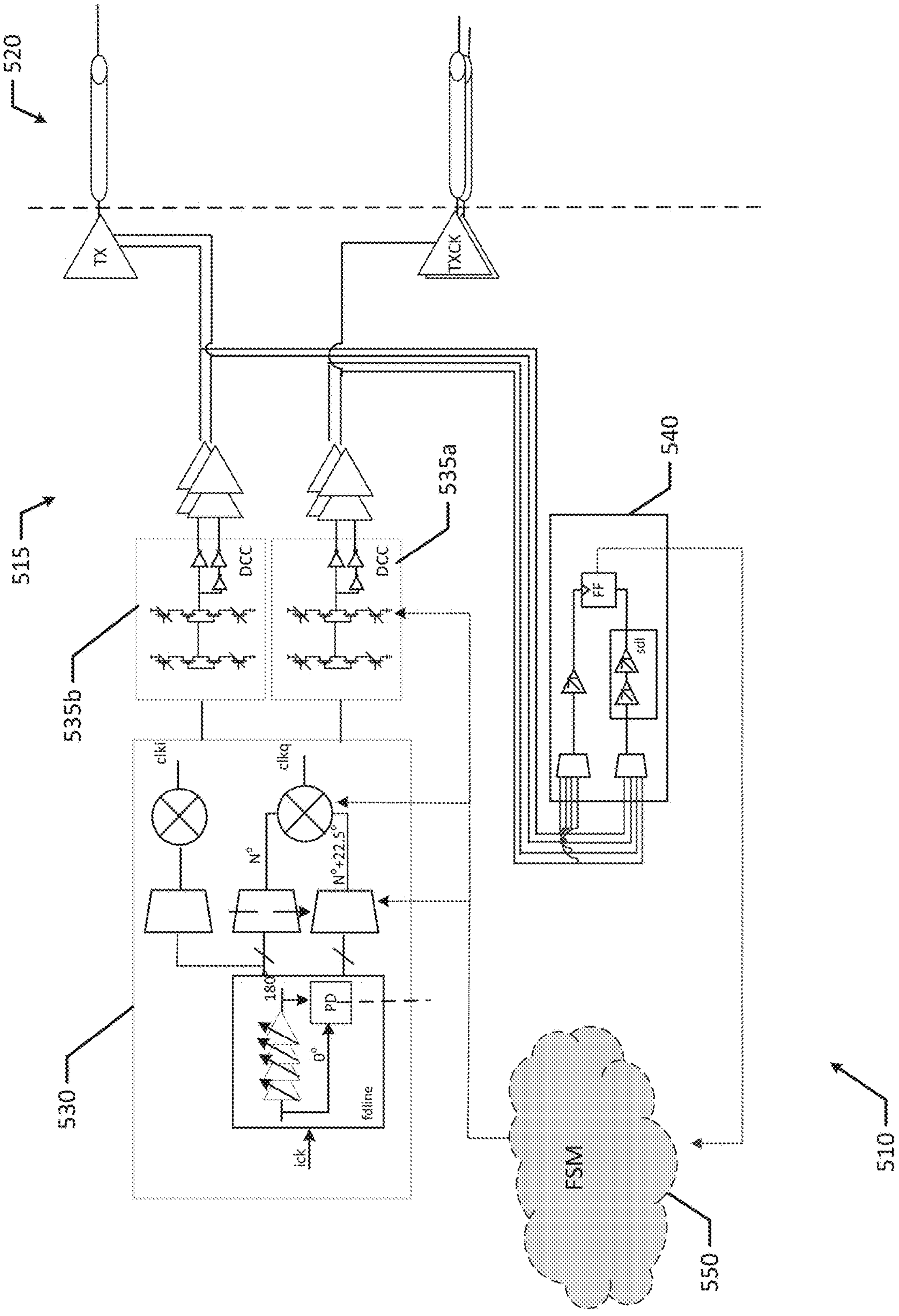
FIG. 5 illustrates a specific example of a clock architecture for use with a D2D interconnect, in accordance with various embodiments.

FIG. 5 illustrates a specific example of a clock architecture 510 for use with a D2D interconnect, in accordance with various embodiments. Specifically, FIG. 5 depicts a specific implementation of elements of a clock architecture 510, which may be similar to clock architecture 410 of architecture 400. Specifically, FIG. 5 depicts a portion of the architecture of a transmitting die 515 and a D2D interconnect link 520, which may be similar to transmitting die 415 and interconnect link 420. As noted, the transmitting die 515 may have clock architecture 510 that includes DLL circuitry 530 and PI/DCC circuitry 535*a* and 535*b*, which may be respectively similar to PI/DCC circuitry 435*a* and 435*b*. The clock architecture 510 may further include QLS/DCS circuitry 540, which may be similar to QLS/DCS circuitry 440. Finally, the clock architecture 510 may include a FSM 550, which may be similar to one or both of the DLL FSM 450 and the PI/DCC FSM 455. It will be noted that, similarly to DLL FSM 450 and PI/DCC FSM 455, in some embodiments the FSM 550 may be, or include, two separate FSMs, while in other embodiments both the DLL FSM and the PI/DCC FSM may be elements of a single FSM.

Generally, various elements of the different circuits such as specific transistors, logic gates, etc. may be seen in FIG. 5. As noted, elements of FIGS. 3-5 may be aspects of one specific implementation, and other implementations may have more, fewer, or different elements than depicted in FIG. 3-5. In some embodiments, certain elements may be communicatively coupled in other ways, certain elements may be directly communicatively coupled, or certain elements may have one or more intervening elements. Other variations may be present in other embodiments.

It will also be understood that the architectures depicted in FIGS. 3-5 are depicted as one-way architectures from the transmitter die to the receiver die. In some embodiments, the D2D interconnect link may be bidirectional. In these embodiments, the "receiver" die may include a separate clock architecture that is configured to adjust the phase of data and clock signals that are transmitted across the D2D interconnect link from the "receiver" die to the "transmitter" die. In other words, the D2D interconnect link may be bidirectional, while the clock architecture may be considered to be unidirectional.

Figure 6:
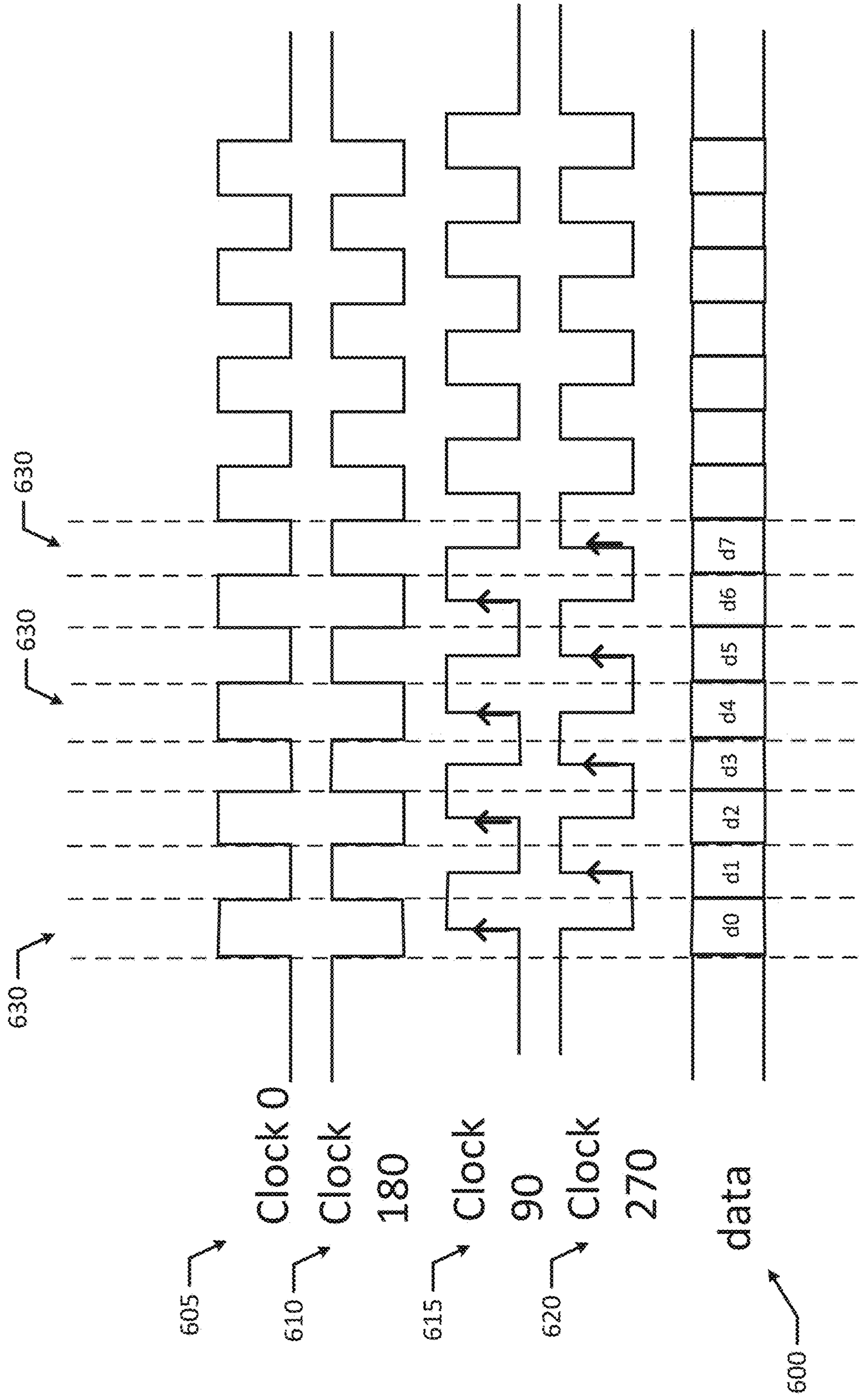
FIG. 6 illustrates examples of timing of clock and data phases, in accordance with various embodiments.

FIG. 6 illustrates examples of timing of clock and data phases, in accordance with various embodiments. Specifically, FIG. 6 depicts an example data transmission at 600. The data transmission 600 may include 8 UIs 630 (numbered in FIG. 6 from d0 to d7).

Generally, when the phase of the data lane 600 is aligned with the phase of the clock lane at 605 (e.g., the phase difference is 0°), then the signal on the clock lane may be generally aligned with each UI 630. Similarly, when the phase of the clock lane is inverted as shown at 610 (e.g., the phase difference is 180°), then the signal on the clock lane may still be aligned with each UI 630.

The clock lane at 615 depicts an example of when the phase of the data lane 600 is 0.5 UI from the phase of the clock lane (e.g., the phase difference is 90°). Similarly, the clock lane at 620 depicts an alternative example of when the phase of the data lane 600 is 0.5 UI from the phase of the clock lane (e.g., the phase difference is 270°). As may be noted, the architectures 300/400 of FIGS. 3 and 4 may be configured to set, at the transmitter, the clock lane to be approximately 90° from the phase of the data lane, as shown through comparison of the clock lane at 615 and the data lane at 600.

Figure 7:
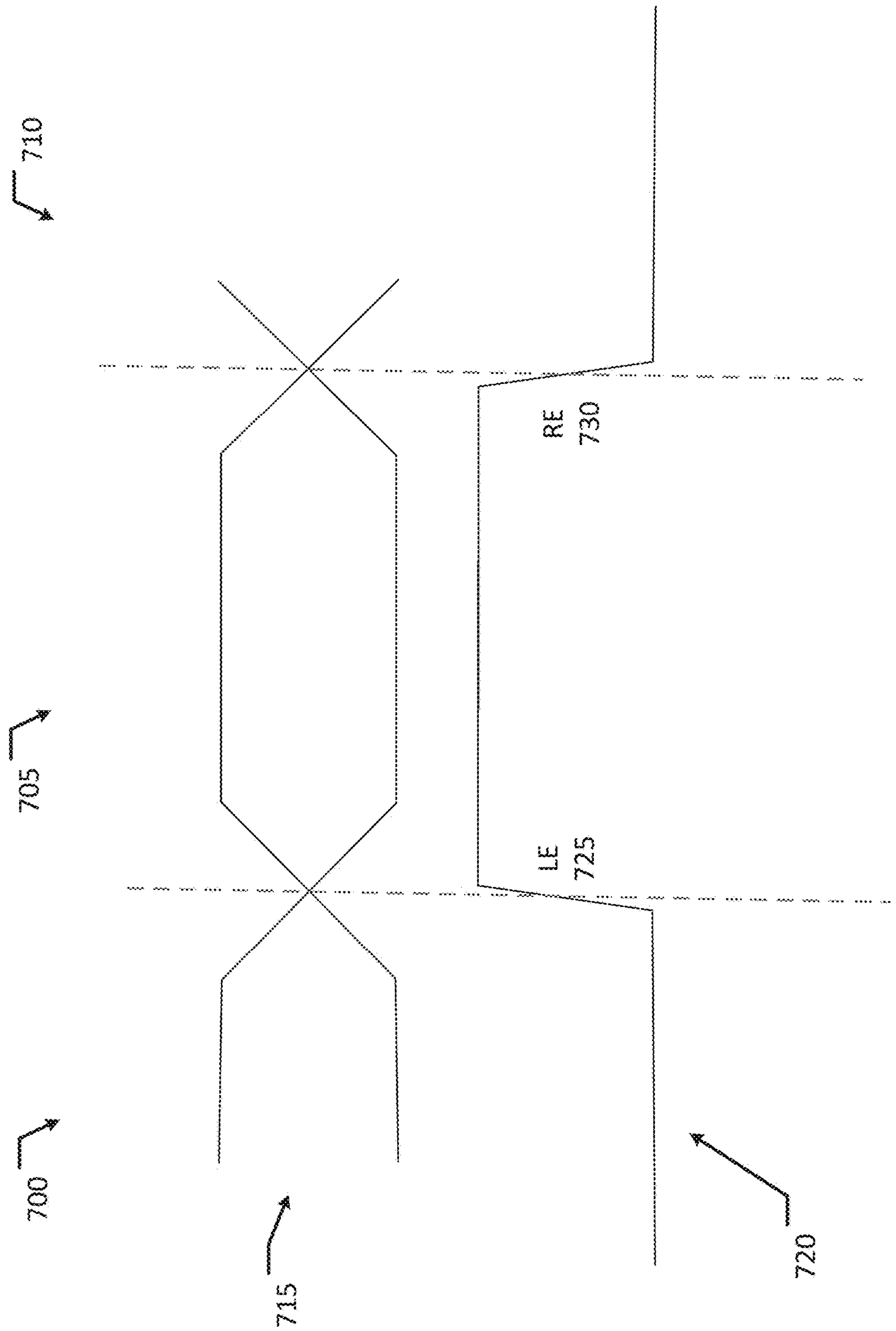
FIG. 7 illustrates an example of timing of a clock and data signal, in accordance with various embodiments.
Figure 8:
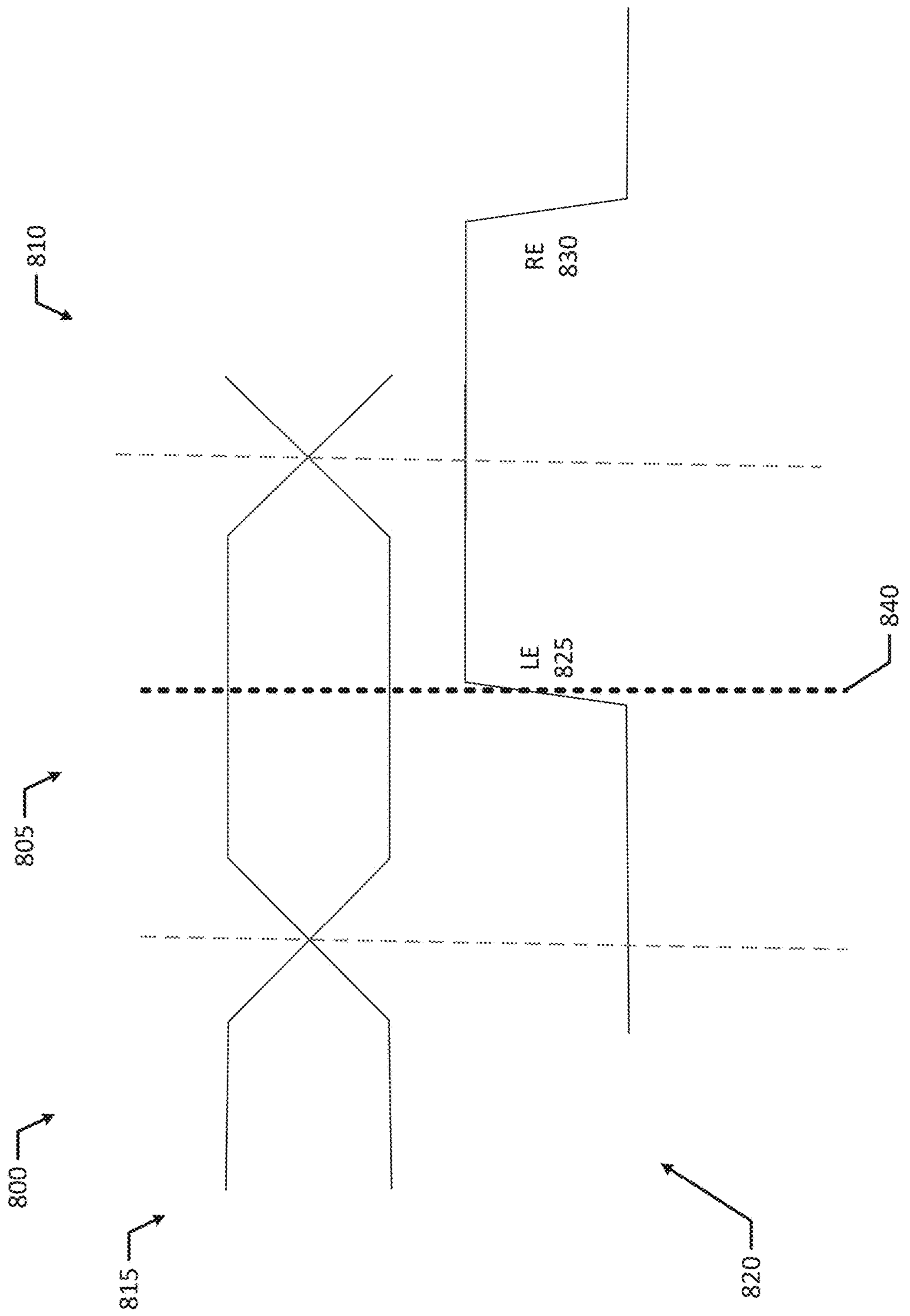
FIG. 8 illustrates an alternative example of timing of a clock and data signal, in accordance with various embodiments.

FIGS. 7 and 8 depict example of timing of a clock and data signal, in accordance with various embodiments. Specifically, FIG. 7 depicts three UIs 700, 705, and 710. FIG. 7 further depicts a data signal 715, such as may be transmitted on a data lane of the cluster of data lanes, and a clock signal 720. As may be seen, the clock signal 720 and the data signal 715 may be seen to be in phase with one another. That is, a left edge 725 (also referred to as a "rising edge") of the clock signal 720 may align with a boundary between UIs 700 and 705. Similarly, the right edge 730 (also referred to as a "falling edge") of the clock signal 720 may align with the boundary between UIs 705 and 710. Such an alignment may be similar to a comparison between the data lane 600 and the clock signal at 605 of FIG. 6.

By comparison, FIG. 8 depicts a similar three UIs 800, 805, and 810. FIG. 8 further depicts a data signal 815 and a clock signal 820, which may be respectively similar to data signal 715 and clock signal 720. However, as may be seen in FIG. 8, the phase of the clock signal 820 may be shifted with respect to the phase of the data signal 815. Specifically, FIG. 8 depicts an approximately 90° phase shift between the phase of the data signal 815 and the phase of the clock signal 820. As may be seen, the data signal 815 may be generally aligned with the boundaries of Us 800, 805, and 810. The center line 840 represents a center of UI 805. In this embodiment, the left edge 825 of the clock signal 820 may be aligned with the center line 840.

It will be noted that, in some embodiments, the left edge 825 of the clock signal 820 may not be placed directly at the center line 840 by the clock architecture of the transmit die. Rather, the left edge 825 may be placed at approximately (e.g., between about +/−5% of a UI, or with a phase difference between approximately 80° and 100°) 90°. Specifically, the transmitter may be aware of one or more characteristics of the receiver and/or the D2D interconnect link which may affect the phase of one or both of the clock signal and the data signal. Such characteristics may include, for example, a physical medium used for the interconnect link, a mismatch between a parameter of the clock signal and a parameter of the data signal, a lane-to-lane data mismatch, clock jitter, or some other characteristic. In this situation, it may be desirable for the clock signal and the data signal to arrive and/or be processed at the receive die with a phase difference of 90°. Therefore, the phase difference of the clock and data signal may be shifted at the transmit die to approximately 90° so that, after transmission and/or processing by the receive die, the phase difference of the clock and data signal at the receive die is 90°. In this way, clock and data jitter may be compensated for and mitigated.

Generally, the clock architecture (e.g., clock architecture 310, 410, or 510), and particularly one or both of the DLL circuitry and DCC/PI circuitry of the clock architecture, may be configured to adjust the phase of the clock signal (e.g., clock signal 820) based on identification of a boundary between UIs 700/800 and 705/805, and an identification of a boundary between UIs 705/805 and UIs 710/810, for example as described above with respect to FIG. 3 or as described elsewhere herein.

In one embodiment, the clock architecture may identify the leftmost boundary (e.g., the boundary between UIs 700/800 and 705/805) at a first time parameter (e.g., $X_1$). The clock architecture may further identify the rightmost boundary (e.g., the boundary between UIs 705/805 and 710/810) at a second time parameter (e.g., $X_2$). The clock architecture may then identify the center line 840 based on the leftmost and rightmost boundary (e.g., $(X_1+X_2)/2$).

In another embodiment, the clock architecture may identify an approximate location of the center line 840 of the UI 805. Such an identification may be based on a pre-programmed or pre-identified location. Using the approximate location as a starting point, the clock architecture may then sweep left to identify the boundary between UI 700/800 and UI 705/805. The clock architecture may then sweep right to identify the boundary between UI 705/805 and 710/810. The clock architecture may then identify, based on the identified left and right boundaries, the location of the center line 840 of UI 805.

It will be understood that the above two techniques are intended as high level examples of possible techniques for identifying the location of the center line 840 which may be used for subsequently adjusting the phase of the clock lane as compared to the data lane(s). Other embodiments may include or involve different techniques to be performed by the clock architecture.

Figure 9:
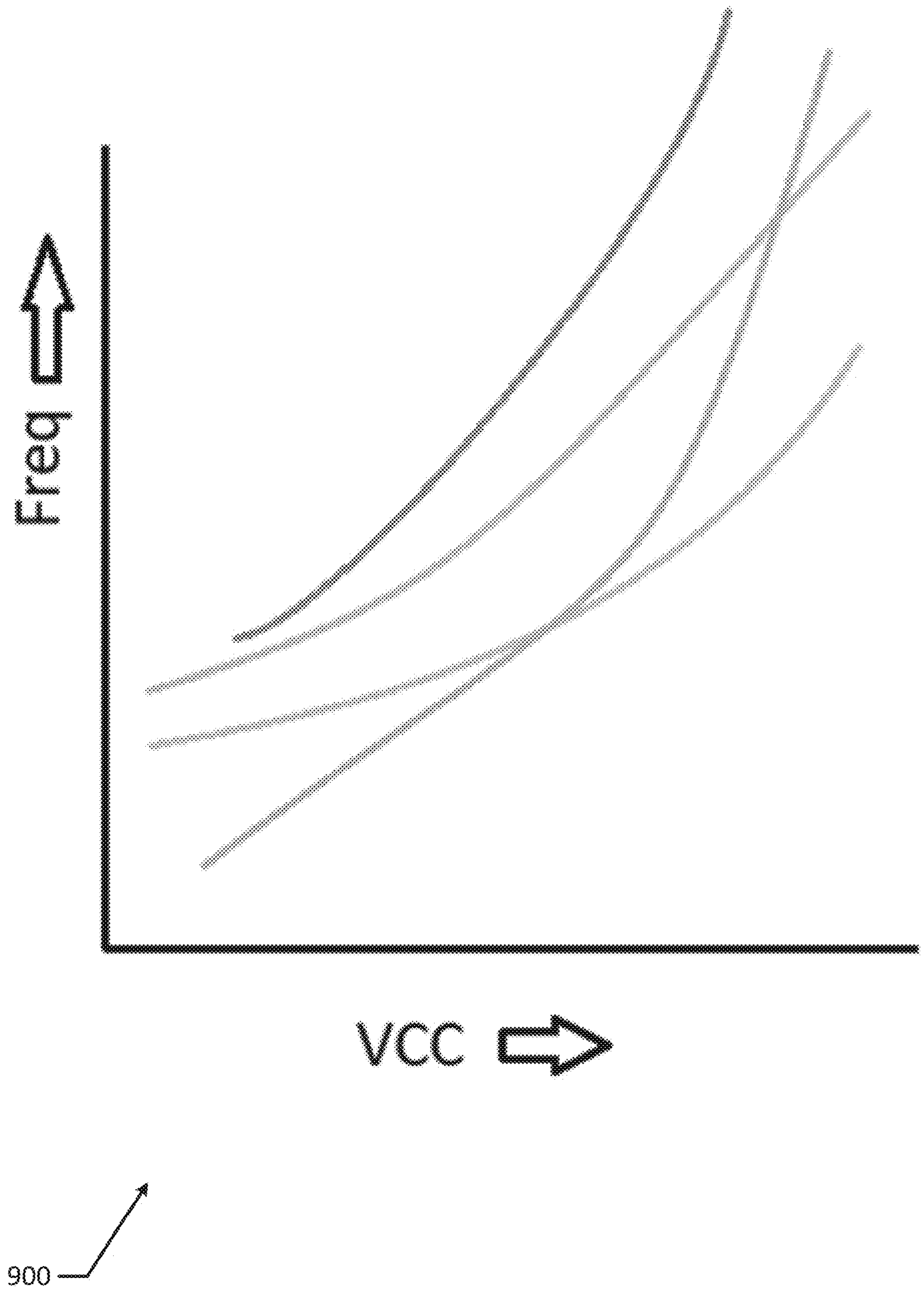
FIG. 9 depicts an example of frequency/voltage (FV) curves for different process nodes, in accordance with various embodiments.

In some embodiments, different dies or elements of a package (e.g., chiplets from different process nodes) may have an intrinsic frequency-voltage (FV) curve. Specifically, as shown in FIG. 9, as voltage ($V_{CC}$) to the chip increases, the optimal frequency of that chip may likewise increase. FIG. 9 depicts an example 900 of different FV curves for different chips.

In some embodiments, the dies/elements/chiplets/etc. may also have die-speed skew, which may be considered to be variation in the speed of different dies/elements/chiplets based on manufacturing variations. In some embodiments, the presence of clock architecture at the transmitter die (e.g., clock architecture 310 at transmitter die 305) may allow for binning, FV-curve optimization, and/or DVFS-independent operation at the same granularity as the number of chiplets that comprise a package such as one of packages **100*a*/100*b*/100*c***. Specifically, the transmitter-side clock architecture may allow for dynamic changes to voltage levels and/or clock frequencies supplied to the chiplets.

Figure 10:
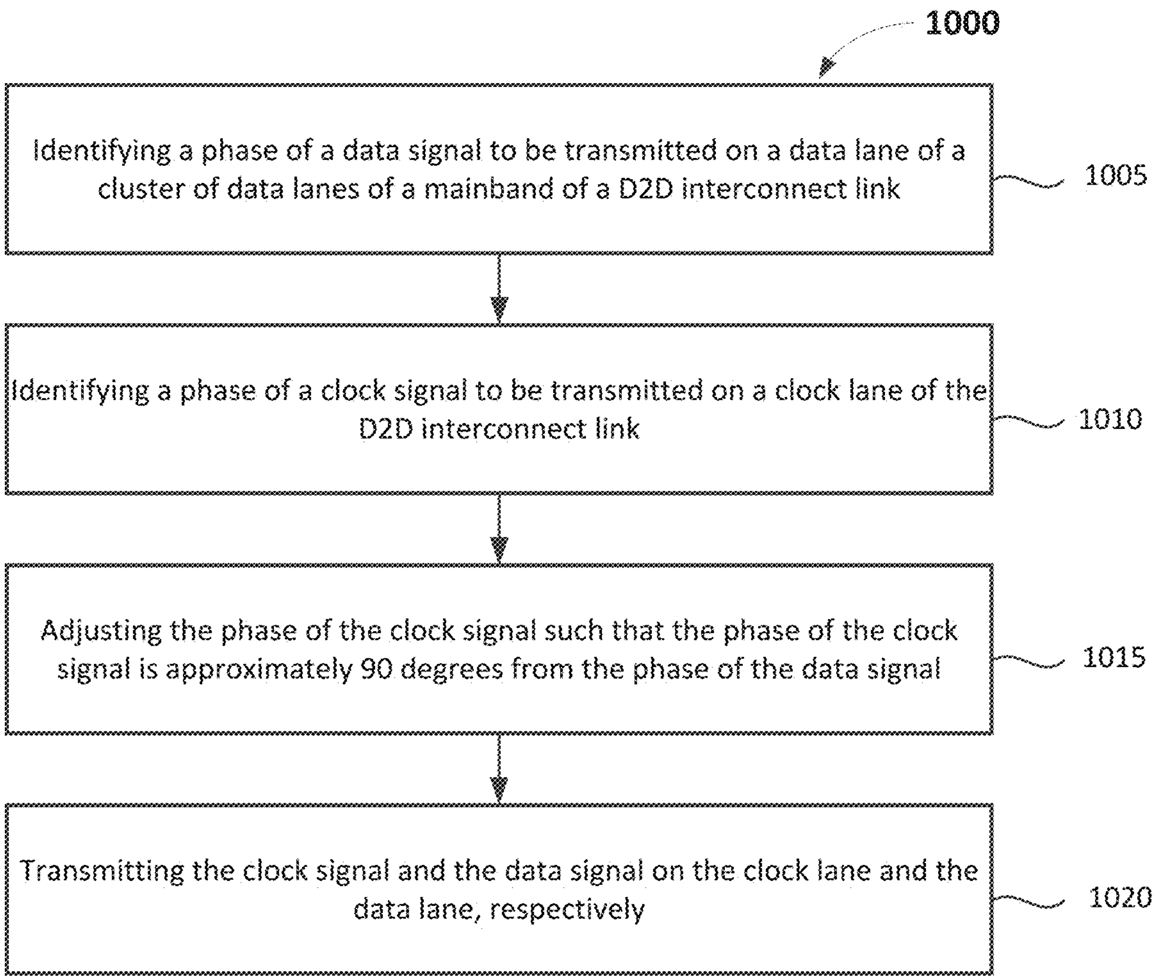
FIG. 10 depicts an example process related to clock phase management in a D2D interconnect, in accordance with various embodiments.

FIG. 10 illustrates an example process 1000 related to clock phase management in a D2D interconnect. The process 1000 may be performed, for example, by a transmitter die such as one of the dies described above with respect to FIG. 1 or 2, and/or some other transmitter die herein. More specifically, the process 1000 may be performed by one or more elements of a clock architecture and/or data architecture of a transmitter die such as clock architecture 310 and data architecture 305, and/or some other clock/data architecture described herein. Generally, the process may be performed by one or more of the DLL (e.g., DLL 330), the PI/DCC circuitry (e.g., element 335), and/or the associated FSMs (e.g., elements 450/455) as described elsewhere herein (e.g., with respect to FIG. 3 or 4).

The process 1000 may include identifying, at 1005, a phase of a data signal to be transmitted on a data lane of a cluster of data lanes of a mainband of a D2D interconnect link. The data signal may be a data signal such as data signal 715 or 815 that is transmitted on a data lane such as that depicted with respect to data architecture 305. In embodiments, the clock architecture and/or an element thereof may perform the described identifying.

The process 1000 may further include identifying, at 1010 (e.g., by a clock architecture and/or one or more elements thereof), a phase of a clock signal to be transmitted on a clock lane of the D2D interconnect link. The clock signal may be a clock signal such as clock signals 720/820, as described above, which is transmitted on a clock lane such as is described with respect to clock architecture 310.

The process 1000 may further include adjusting, at 1015 (e.g., by the clock architecture and/or one or more elements thereof), the phase of the clock signal such that the phase of the clock signal is approximately 90 degrees from the phase of the data signal. Specifically, the phase of a clock signal such as clock signal 720 may be adjusted with respect to a data signal (e.g., data signal 715) to be approximately 90° from the phase of the data signal as shown in FIG. 8. As noted, approximately 90° may refer to between 80° and 100° or approximately +/−0.5 UI.

The process 1000 may then include transmitting, at 1020, the clock signal and the data signal on the clock lane and the data lane, respectively, as described above. For example, the clock architecture (and/or one or more elements thereof) may transmit the clock signal generally concurrently with the transmission of the data signal by the data architecture (and/or one or more elements thereof) as described above.

It should be understood that the actions described in reference to FIG. 10 may not necessarily occur in the described sequence. For example, certain elements may occur in an order different than that described, concurrently with one another, etc. In some embodiments, the process 1000 may include more or fewer elements than depicted or described.

Figure 11:
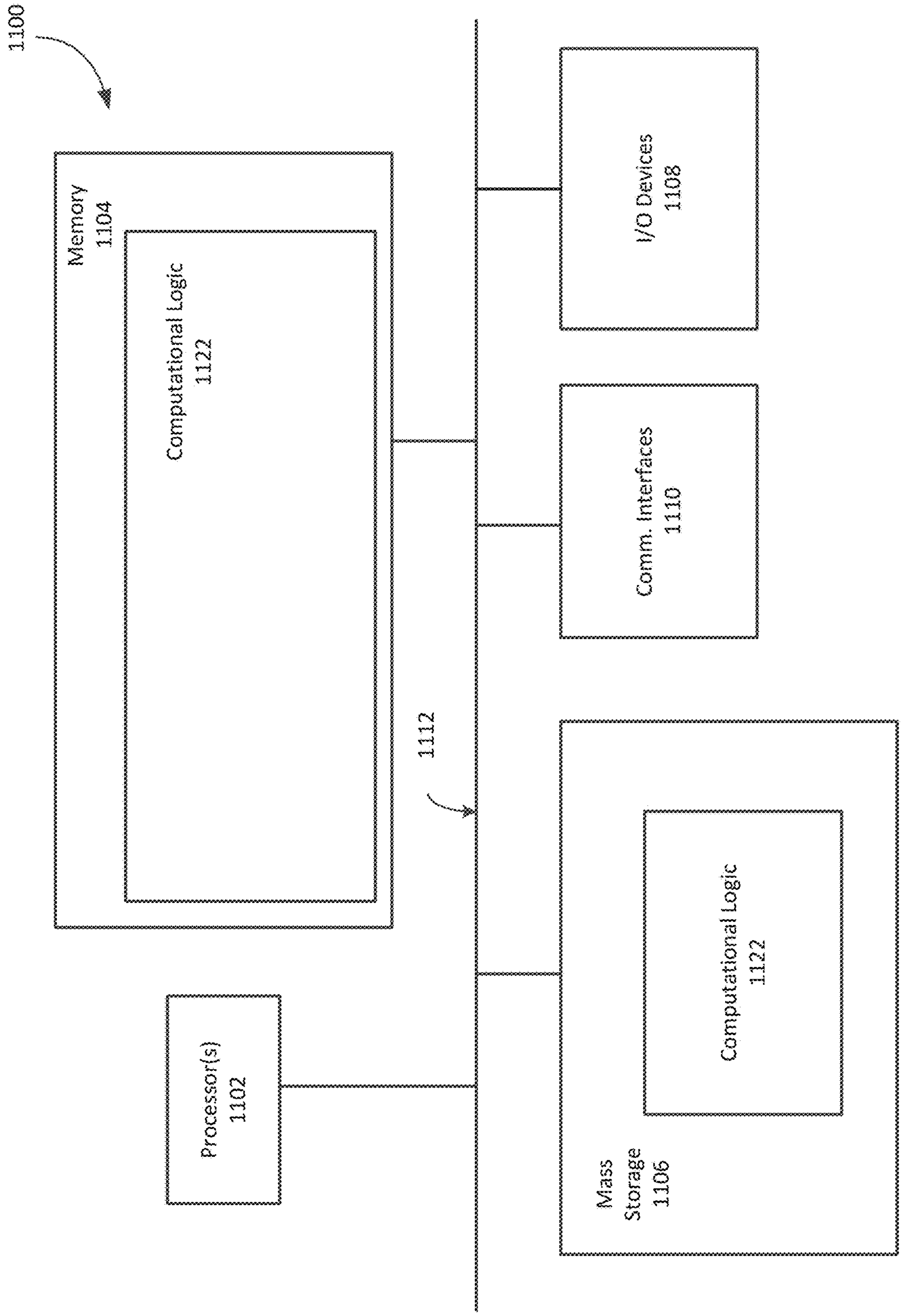
FIG. 11 illustrates an example computing system suitable for practicing various aspects of the disclosure, in accordance with various embodiments.

FIG. 11 illustrates an example computing device 1100 suitable for use to practice aspects of the present disclosure, in accordance with various embodiments. For example, the example computing device 1100 may be suitable to implement the functionalities associated with any of FIGS. 1-10, and or some other process, technique, and/or functionality described herein, in whole or in part. More specifically, the computing device 1100 may include a number of packages such as packages **100*a*, 100*b*, 100*c***, and/or some other package herein, which may be configured to communicate via a D2D interconnect link as described above.

As shown, computing device 1100 may include one or more processors 1102, each having one or more processor cores, and system memory 1104. The processor 1102 may include any type of unicore or multi-core processors. Each processor core may include a central processing unit (CPU), and one or more level of caches. The processor 1102 may be implemented as an integrated circuit. The computing device 1100 may include mass storage devices 1106 (such as diskette, hard drive, volatile memory (e.g., dynamic random access memory (DRAM)), compact disc read only memory (CD-ROM), digital versatile disk (DVD) and so forth). In general, system memory 1104 and/or mass storage devices 1106 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 1100 may further include input/output (I/O) devices 1108 such as a display, keyboard, cursor control, remote control, gaming controller, image capture device, one or more three-dimensional cameras used to capture images, and so forth, and communication interfaces 1110 (such as network interface cards, modems, infrared receivers, radio receivers (e.g., Bluetooth), and so forth). I/O devices 1108 may be suitable for communicative connections with three-dimensional cameras or user devices. In some embodiments, I/O devices 1108 when used as user devices may include a device necessary for implementing the functionalities of receiving an image captured by a camera.

The communication interfaces 1110 may include communication chips (not shown) that may be configured to operate the device 1100 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1110 may operate in accordance with other wireless protocols in other embodiments.

The above-described computing device 1100 elements may be coupled to each other via system bus 1112, which may represent one or more buses. In the case of multiple buses, they may be bridged by one or more bus bridges (not shown). Each of these elements may perform its conventional functions known in the art. In particular, system memory 1104 and mass storage devices 1106 may be employed to store a working copy and a permanent copy of the programming instructions implementing the operations and functionalities associated with any of FIGS. 1-10, and/or some other process, technique, or functionality described herein, in whole or in part, generally shown as computational logic 1122. Computational logic 1122 may be implemented by assembler instructions supported by processor(s) 1102 or high-level languages that may be compiled into such instructions.

The permanent copy of the programming instructions may be placed into mass storage devices 1106 in the factory, or in the field, though, for example, a distribution medium (not shown), such as a compact disc (CD), or through communication interfaces 1110 (from a distribution server (not shown)).

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

Example 1 includes a method to be performed by one or more processors of an electronic device, wherein the method comprises: identifying, by the one or more processors, data that is to be transmitted from a die via a D2D interconnect link; setting, by the one or more processors, a data-to-clock delay path separation to between approximately 0.25 unit interval (UI) and 0.75 UI; performing, by the one or more processors, clock adjustment at the transmit side of the D2D interconnect link; and facilitating, by the one or more processors, transmission of the data from the die via the D2D interconnect link in accordance with the data-to-clock delay path separation and the clock adjustment.

Example 2 includes the method of example 1, or some other example herein, wherein the D2D interconnect link is a chiplet express interconnect (CXi) link.

Example 3 includes the method of any of examples 1-2, or some other example herein, wherein the data-to-clock delay path separation is approximately 0.5 UI.

Example 4 includes the method of any of examples 1-3, or some other example herein, wherein the clock adjustment includes fine-train timing adjustments using a delay locked loop (DLL) and/or phase interpolator (PI) at the transmit side of the D2D interconnect link.

Example 5 includes the method of any of examples 1-4, or some other example herein, wherein facilitating transmission of the data includes forwarding, by the one or more processors, information related to VCC at the transmit side of the D2D interconnect link to the receive side of the D2D interconnect link.

Example 6 includes the method of example 5, or some other example herein, further comprising facilitating, by the one or more processors, dynamic voltage and frequency scaling (DVFS) operation based on the forwarded VCC.

Example 7 includes the method of any of examples 1-6, or some other example herein, further comprising performing, by the one or more processors, optimized power consumption for the die based on an optimized frequency/voltage (FV) curve for the die.

Example 8 includes the method of any of examples 1-7, or some other example herein, wherein the die may also be referred to as a "chiplet."

Example 9 may include a die for use in a multi-die package, wherein the die comprises: an interface to transmit data over a die-to-die (D2D) interconnect link to a second die of the package, wherein the interconnect link includes a sideband and a mainband, and wherein the mainband includes a differential clock lane, a valid lane, and a cluster of data lanes; and clock circuitry to: identify a phase of a data signal to be transmitted on a data lane of the cluster of data lanes; identify a phase of a clock signal to be transmitted on a clock lane of the D2D interconnect link; adjust the phase of the clock signal such that the phase of the clock signal is approximately 90 degrees from the phase of the data signal, wherein adjustment of the phase of the clock signal is to cause the second die to identify the clock signal as having a phase that is 90 degrees from the phase of the data signal; and transmit the clock signal on the clock lane.

Example 10 may include the die of example 8, and/or some other example herein, wherein the clock circuit includes delay lock loop (DLL) circuitry and phase interpolator (PI) circuitry.

Example 11 may include the die of example 8, and/or some other example herein, wherein approximately 90 degrees is a range between 80 degrees and 100 degrees.

Example 12 may include the die of example 8, and/or some other example herein, wherein adjustment of the phase of the clock signal includes adjustment of the phase of the clock signal such that a rising edge of the clock signal is at the approximate center of a unit interval (UI) of the data signal.

Example 13 may include the die of example 12, and/or some other example herein, wherein the approximate center of the UI of the data signal is a range between 20% and −20% of the UI from the center of the UI of the data signal.

Example 14 may include the die of example 12, and/or some other example herein, wherein a UI has a length of 500 picoseconds.

Example 15 may include the die of example 8, and/or some other example herein, wherein the interconnect link includes the data lane, the clock lane, and a valid lane on which a valid signal is transmitted that is used by a receiver of the D2D interconnect link to frame the data signal.

Example 16 may include the die of example 8, and/or some other example herein, wherein an amount of adjustment of the phase of the clock signal is based on a physical medium used for the interconnect link, a characteristic of the first die or the second die, or a mismatch between a parameter of the clock signal and a parameter of the data signal.

Example 17 may include the die of example 8, and/or some other example herein, wherein the clock signal has a frequency of at least 2 gigahertz (GHz).

Example 18 may include the die of example 8, and/or some other example herein, wherein adjustment of the phase of the clock signal includes: identification of a time location of a left edge of a unit interval (UI) of the data signal; identification of a time location of a right edge of the UI of the data signal; and identification, based on the time location of the left edge of the UI and the time location of the right edge of the UI, of a time location of a center of the UI.

Example 19 may include a package comprising: a receiver die; a die-to-die (D2D) interconnect link that communicatively couples a transmitter die and the receiver die; and the transmitter die, wherein the transmitter die is to: identify a phase of a data signal to be transmitted on a data lane of the D2D interconnect link; identify a phase of a clock signal to be transmitted on a clock lane of the D2D interconnect link; adjust the phase of the clock signal such that the phase of the clock signal is approximately 90 degrees from the phase of the data signal, wherein an amount of adjustment of the phase of the clock signal is based on a physical medium used for the interconnect link, a characteristic of the first die or the second die, a mismatch between a parameter of the clock signal and a parameter of the data signal, a data lane-to-clock lane mismatch, or clock jitter; and transmit the clock signal and the data signal on the clock lane and the data lane, respectively.

Example 20 may include the package of example 19, and/or some other example herein, wherein the clock circuit includes delay lock loop (DLL) circuitry and phase interpolator (PI) circuitry.

Example 21 may include the package of example 19, and/or some other example herein, wherein approximately 90 degrees is a range between 80 degrees and 100 degrees.

Example 22 may include the package of example 19, and/or some other example herein, wherein adjustment of the phase of the clock signal includes adjustment of the phase of the clock signal such that a rising edge of the clock signal is at the approximate center of a unit interval (UI) of the data signal.

Example 23 may include the package of example 19, and/or some other example herein, wherein adjustment of the phase of the clock signal includes adjustment of the phase of the clock signal such that a falling edge of the clock signal is at the approximate center of a unit interval (UI) of the data signal.

Example 24 may include the package of example 23, and/or some other example herein, wherein the approximate center of the UI of the data signal is a range between 5% and −5% of the UI from the center of the UI of the data signal.

Example 25 may include the package of example 23, and/or some other example herein, wherein a UI has a length of 100 picoseconds.

Example 26 may include the package of example 19, and/or some other example herein, wherein the interconnect link includes the data lane, the clock lane, and a valid lane on which a valid signal is transmitted that is used by the receiver die to frame the data signal.

Example 27 may include the package of example 19, and/or some other example herein, wherein adjustment of the phase of the clock signal is to cause the receiver die to identify the clock signal as having a phase that is 90° from the phase of the data signal.

Example 28 may include the package of example 19, and/or some other example herein, wherein the clock signal has a frequency of at least 10 gigahertz (GHz).

Example 29 may include the package of example 19, and/or some other example herein, wherein adjustment of the phase of the clock signal includes: identification of a time location of a left edge of a unit interval (UI) of the data signal; identification of a time location of a right edge of the UI of the data signal; and identification, based on the time location of the left edge of the UI and the time location of the right edge of the UI, of a time location of a center of the UI.

Example 30 may include a method to be performed by a transmitter of a die-to-die (D2D) interconnect link, wherein the method comprises: identifying, by the transmitter, a phase of a data signal to be transmitted on a data lane of the D2D interconnect link; identifying, by the transmitter, a phase of a clock signal to be transmitted on a clock lane of the D2D interconnect link; adjusting, by the transmitter, the phase of the clock signal so that the phase of the clock signal is approximately 90 degrees from the phase of the data signal; and transmitting, by the transmitter, the clock signal and the data signal on the clock lane and the data lane, respectively.

Example 31 may include the method of example 30, and/or some other example herein, wherein approximately 90 degrees is a range between 70 degrees and 110 degrees.

Example 32 may include the method of example 30, and/or some other example herein, wherein adjusting the phase of the clock signal includes adjusting the phase of the clock signal such that a rising edge of the clock signal is at the approximate center of a unit interval (UI) of the data signal.

Example 33 may include the method of example 32, and/or some other example herein, wherein the approximate center of the UI of the data signal is a range between 10% and −10% of the UI from the center of the UI of the data signal.

Example 34 may include the method of example 32, and/or some other example herein, wherein a UI has a length of between 100 picoseconds and 500 picoseconds.

Example 35 may include the method of example 30, and/or some other example herein, wherein the interconnect link includes the data lane, the clock lane, and a valid lane on which a valid signal is transmitted that is used by a receiver of the D2D interconnect link to frame the data signal.

Example 36 may include the method of example 30, and/or some other example herein, wherein an amount of adjustment of the phase of the clock signal is based on a physical medium used for the interconnect link, a characteristic of a die coupled to the interconnect link, or a mismatch between a parameter of the clock signal and a parameter of the data signal.

Example 37 may include the method of example 30, and/or some other example herein, wherein the D2D interconnect link is between a first die and a second die of a package.

Example 38 may include the method of example 30, and/or some other example herein, wherein the clock signal has a frequency of greater than 2 gigahertz (GHz).

Example 39 may include the method of example 30, and/or some other example herein, wherein adjusting the phase of the clock signal includes: identifying a time location of a left edge of a unit interval (UI) of the data signal; identifying a time location of a right edge of the UI of the data signal; and identifying, based on the time location of the left edge of the UI and the time location of the right edge of the UI, a time location of a center of the UI.

Example Z01 may include an apparatus comprising means to perform one or more elements of a method described in or related to any of examples herein, or any other method or process described herein.

Example Z02 may include an apparatus comprising logic, modules, or circuitry to perform one or more elements of a method described in or related to any of examples herein, or any other method or process described herein.

Example Z03 may include a method, technique, or process as described in or related to any of examples herein, or portions or parts thereof.

Example Z04 may include a signal as described in or related to any of examples herein, or portions or parts thereof.

The invention claimed is:

1. A die for use in a multi-die package, wherein the die comprises:

an interface to transmit data over a die-to-die (D2D) interconnect link to a second die of the package, wherein the interconnect link includes a sideband and a mainband, and wherein the mainband includes a differential clock lane, a valid lane, and a cluster of data lanes; and clock circuitry to:

identify a phase of a data signal to be transmitted on a data lane of the cluster of data lanes;

identify a phase of a clock signal to be transmitted on a clock lane of the D2D interconnect link;

adjust the phase of the clock signal such that the phase of the clock signal is approximately 90 degrees from the phase of the data signal, wherein adjustment of the phase of the clock signal is to cause the second die to identify the clock signal as having a phase that is 90 degrees from the phase of the data signal; and transmit the clock signal on the clock lane, wherein the clock circuit includes delay lock loop (DLL) circuitry and phase interpolator (PI) circuitry.

2. The die of claim 1, wherein approximately 90 degrees is a range between 80 degrees and 100 degrees.

3. The die of claim 1, wherein adjustment of the phase of the clock signal includes adjustment of the phase of the clock signal such that a rising edge of the clock signal is at the approximate center of a unit interval (UI) of the data signal.

4. The die of claim 1, wherein the interconnect link includes the data lane, the clock lane, and a valid lane on which a valid signal is transmitted that is used by a receiver of the D2D interconnect link to frame the data signal.

5. The die of claim 1, wherein an amount of adjustment of the phase of the clock signal is based on a physical medium used for the interconnect link, a characteristic of the first die or the second die, or a mismatch between a parameter of the clock signal and a parameter of the data signal.

6. The die of claim 1, wherein the clock signal has a frequency of at least 2 gigahertz (GHz).

7. The die of claim 1, wherein adjustment of the phase of the clock signal includes:

identification of a time location of a left edge of a unit interval (UI) of the data signal;

identification of a time location of a right edge of the UI of the data signal; and identification, based on the time location of the left edge of the UI and the time location of the right edge of the UI, of a time location of a center of the UI.

8. A package comprising:

a receiver die;

a die-to-die (D2D) interconnect link that communicatively couples a transmitter die and the receiver die; and the transmitter die, wherein the transmitter die is to:

identify a phase of a data signal to be transmitted on a data lane of the D2D interconnect link;

identify a phase of a clock signal to be transmitted on a clock lane of the D2D interconnect link;

adjust the phase of the clock signal such that the phase of the clock signal is approximately 90 degrees from the phase of the data signal, wherein an amount of adjustment of the phase of the clock signal is based on a physical medium used for the interconnect link, a characteristic of the first die or the second die, a mismatch between a parameter of the clock signal and a parameter of the data signal, a data lane-to-clock lane mismatch, or clock jitter; and transmit the clock signal and the data signal on the clock lane and the data lane, respectively, wherein the transmitter die includes delay lock loop (DLL) circuitry and phase interpolator (PI) circuitry to adjust the phase of the clock signal.

9. The package of claim 8, wherein approximately 90 degrees is a range between 80 degrees and 100 degrees.

10. The package of claim 8, wherein adjustment of the phase of the clock signal includes adjustment of the phase of the clock signal such that a rising edge of the clock signal is at the approximate center of a unit interval (UI) of the data signal.

11. The package of claim 8, wherein adjustment of the phase of the clock signal includes adjustment of the phase of the clock signal such that a falling edge of the clock signal is at the approximate center of a unit interval (UI) of the data signal.

12. The package of claim 8, wherein the interconnect link includes the data lane, the clock lane, and a valid lane on which a valid signal is transmitted that is used by the receiver die to frame the data signal.

13. The package of claim 8, wherein adjustment of the phase of the clock signal is to cause the receiver die to identify the clock signal as having a phase that is 90° from the phase of the data signal.

14. The package of claim 8, wherein adjustment of the phase of the clock signal includes:

identification of a time location of a left edge of a unit interval (UI) of the data signal;

identification of a time location of a right edge of the UI of the data signal; and identification, based on the time location of the left edge of the UI and the time location of the right edge of the UI, of a time location of a center of the UI.

15. A method to be performed by a transmitter of a die-to-die (D2D) interconnect link, wherein the method comprises:

identifying, by the transmitter, a phase of a data signal to be transmitted on a data lane of a D2D interconnect link, wherein the D2D interconnect link couples a first die to a second die in a package, and the D2D interconnect link includes a sideband and a mainband, wherein the mainband includes a differential clock lane, a valid lane, and a cluster of data lanes, wherein the cluster of data lanes comprises the data lane;

identifying, by the transmitter, a phase of a clock signal to be transmitted on the clock lane;

adjusting, using a phase interpolator and a delay-locked loop (DLL) of the transmitter, the phase of the clock signal so that the phase of the clock signal is approximately 90 degrees from the phase of the data signal; and transmitting, by the transmitter, the clock signal and the data signal on the clock lane and the data lane, respectively.

16. The method of claim 15, wherein adjusting the phase of the clock signal includes adjusting the phase of the clock signal such that a rising edge of the clock signal is at the approximate center of a unit interval (UI) of the data signal.

17. The method of claim 15, further comprising transmitting, by the transmitter, a valid signal on the valid lane to frame data on the data signal.

18. The method of claim 15, wherein an amount of adjustment of the phase of the clock signal is based on a physical medium used for the interconnect link, a characteristic of a die coupled to the interconnect link, or a mismatch between a parameter of the clock signal and a parameter of the data signal.

19. The method of claim 15, wherein adjusting the phase of the clock signal includes:

identifying a time location of a left edge of a unit interval (UI) of the data signal;

identifying a time location of a right edge of the UI of the data signal; and identifying, based on the time location of the left edge of the UI and the time location of the right edge of the UI, a time location of a center of the UI.

* * * * *